US011025651B2

(12) United States Patent
AlGarawi et al.

(10) Patent No.: US 11,025,651 B2
(45) Date of Patent: Jun. 1, 2021

(54) SYSTEM AND METHOD FOR ENHANCED SECURITY ANALYSIS FOR QUARANTINED EMAIL MESSAGES

(71) Applicant: Saudi Arabian Oil Company, Dhahran (SA)

(72) Inventors: Reem Abdullah AlGarawi, Dhahran (SA); Fawaz Yousif Al-Homoud, Dhahran (SA); Abdullah Mahmoud Almahmoud, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 225 days.

(21) Appl. No.: 16/211,952

(22) Filed: Dec. 6, 2018

(65) Prior Publication Data

US 2020/0186543 A1 Jun. 11, 2020

(51) Int. Cl.
*H04L 29/06* (2006.01)
*H04L 12/58* (2006.01)

(52) U.S. Cl.
CPC .......... *H04L 63/1416* (2013.01); *H04L 51/12* (2013.01)

(58) Field of Classification Search
CPC ..... H04L 63/1416; H04L 51/12; H04L 51/08; H04L 63/145; H04L 63/1441
See application file for complete search history.

(56) References Cited

U.S. PATENT DOCUMENTS 7,854,007 B2  12/2010  Sprosts et al.
8,566,938 B1  10/2013  Prakash et al.
2005/0071432 A1* 3/2005 Royston, III ........... H04L 51/12
                                                      709/206
2008/0005325 A1* 1/2008 Wynn .................. G06Q 10/107
                                                      709/225
2008/0256187 A1  10/2008  Kay
2014/0020047 A1  1/2014  Liebmann et al.
(Continued)

FOREIGN PATENT DOCUMENTS

GB     2430335 A1    3/2007
WO  2005043846 A1   12/2005

OTHER PUBLICATIONS

Emre Tinaztepe: "Yara Rules for Incident Response : Binalyze'" Nov. 24, 2018, XP55666953, retrieved from the Internet: URL https://binalyze.com/blog/extending-yara-for-incident-response.
(Continued)

*Primary Examiner* — Kevin Bechtel
*Assistant Examiner* — Hamid Talaminaei
(74) *Attorney, Agent, or Firm* — Leason Ellis LLP

(57) ABSTRACT

A method of enabling enhanced security analysis for quarantined email messages, comprises receiving, at an email gateway an inbound email message from an external network, determining whether the email message is to be quarantined, restructuring the email message, if the message is to be quarantined, as an attachment for a new email, constructing a new email message addressed to a secure repository on a secure pathway, attaching the restructured email message to the new email message and releasing the new email message that includes the restructured email message as an attachment. Threat analysis is performed by one or more security services in the secure pathway. Suspicious emails and analysis results are stored in the secure repository.

16 Claims, 4 Drawing Sheets

(56) References Cited

U.S. PATENT DOCUMENTS

2018/0091453 A1\* 3/2018 Jakobsson ............... H04L 51/12
2018/0191754 A1\* 7/2018 Higbee ................ G06F 21/554

OTHER PUBLICATIONS

International Search Report and Written Opinion in Corresponding PCT Application No. PCT/US19/64720 dated Jan. 21, 2020. 10 pages.
Written Opinion of the International Preliminary Examining Authority in corresponding PCT Application No. PCT/US2019/064720 dated Nov. 2, 2020. 7 pages.

\* cited by examiner

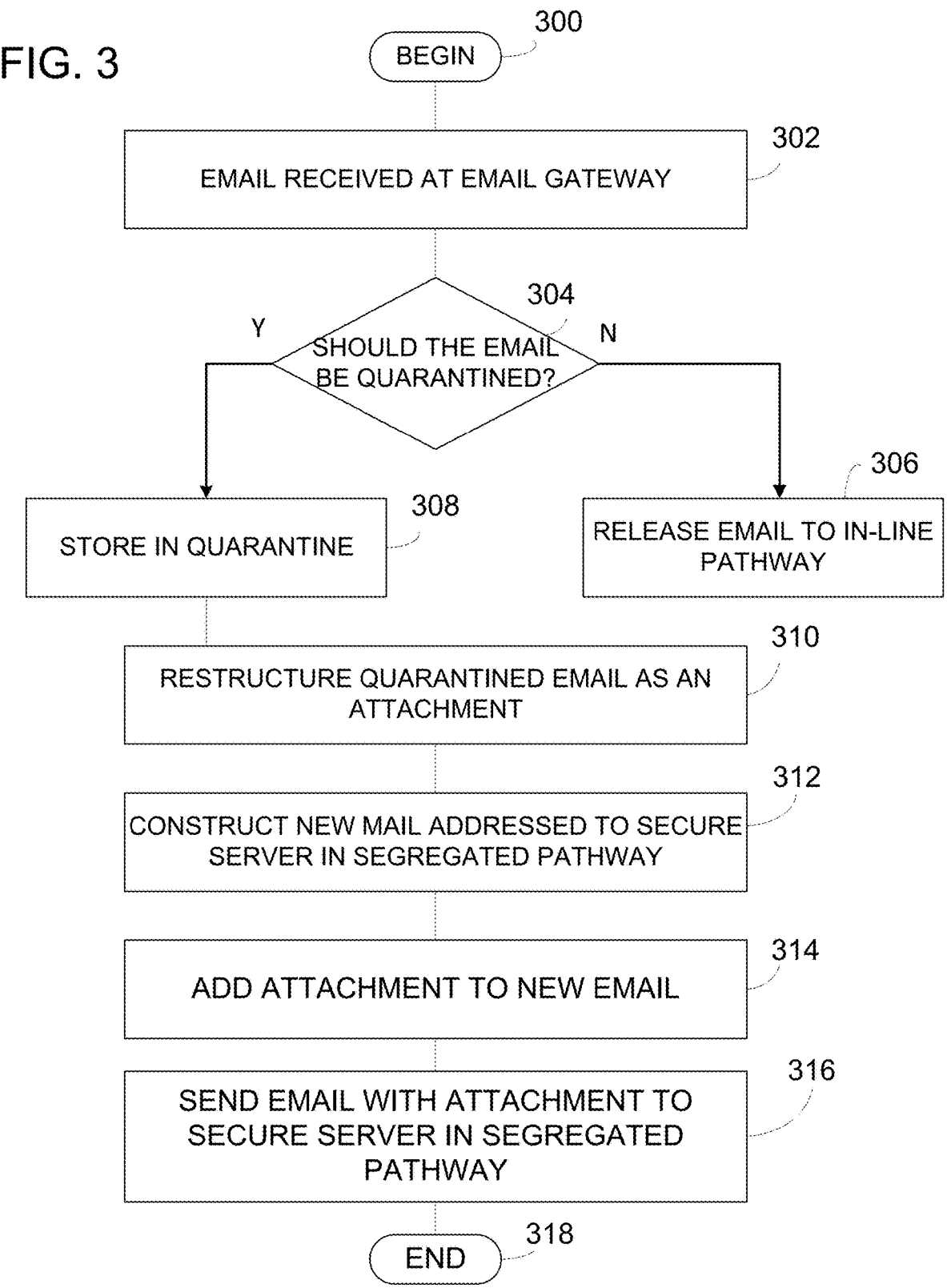

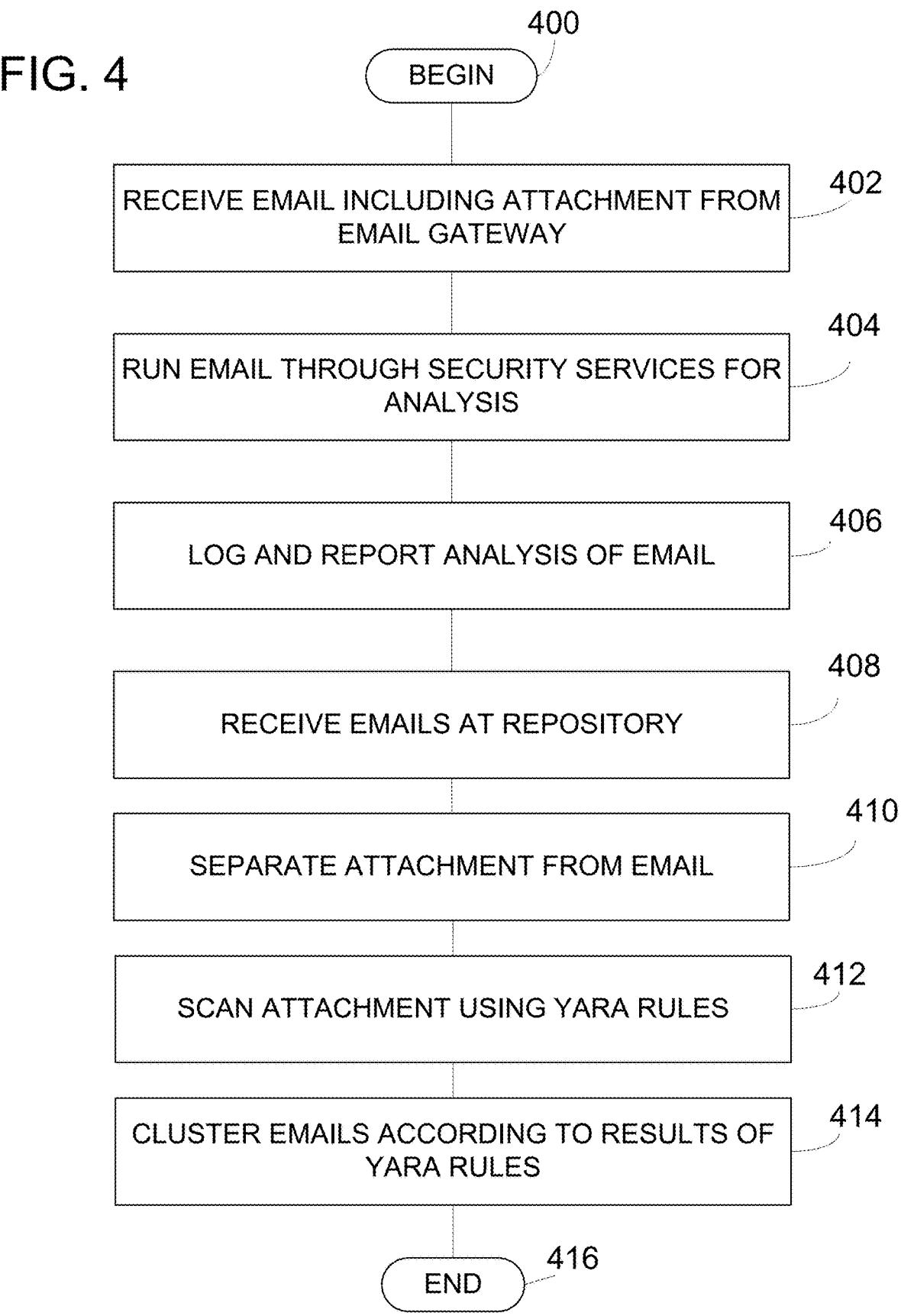

SYSTEM AND METHOD FOR ENHANCED SECURITY ANALYSIS FOR QUARANTINED EMAIL MESSAGES

FIELD OF THE INVENTION

The present invention relates to information systems and security, and, more particularly, relates to a system and method for enhanced security analysis for quarantined email messages.

BACKGROUND OF THE INVENTION

With the proliferation of cyber-threats, many organizations employ multiple layers of IT protection. As an example, incoming email messages arriving from external network can be inspected by multiple security layers starting with an email gateway. Email gateways can be configured to perform initial anti-virus checks, implement anti-spam, and perform other customized security controls. Additional security layers can implement more advanced persistent threat solutions and standalone anti-virus solutions on messages that pass through the initial gateway layer. The additional security layers also can inspect the incoming email messages against built-in signatures and customized rules. Current advanced solutions implemented in the additional protection layers can accumulate information about threats and build "cyber intelligence" regarding threat patterns.

The default behavior of the initial email gateway layer is to block any suspicious email message, for instance, if the message matches any of the configured blocking rules. While this default behavior provides an important layer of protection, emails that are blocked by the email gateway do not pass through the remaining security solutions, which results in the loss of potentially valuable cyber intelligence. Moreover, the blocked email messages cannot be simply forwarded from the email gateway for further analysis because in this process the structure of the body and header of the original email changes and the header information is automatically lost.

What is therefore needed is a system and method of obtaining the complete original information from all email messages blocked at the initial gateway to enhance knowledge of potential cyber threats. The present invention addresses this need in the art.

SUMMARY OF THE INVENTION

Embodiments of the present invention include a method of enabling enhanced security analysis for quarantined email messages. The method comprises receiving, at an email gateway an inbound email message from an external network, determining whether the email message is to be quarantined, restructuring the email message, if the message is to be quarantined, as an attachment for a new email, constructing a new email message address to a secure repository on a secure pathway, attaching the restructured email message to the new email message, and releasing the new email message that includes the restructured email message as an attachment. The restructured email message includes the original versions of the email message received at the email gateway from the external network.

In some embodiments, the email message is released to regular security services along an in-line pathway when it is determined that the message is not to be quarantined.

In certain implementations, the determination as to whether the email message is to be quarantined is performed by comparing one or more parts of the email message against configured lists of suspicious indicators.

Embodiments of the present invention also include a method of enhanced security analysis for quarantined email messages. The method comprises receiving at one or more security service in a secure pathway an email that includes as an attachment a complete suspicious email including header and body content, analyzing the attachment using the one or more security services, logging results of the analyzing step, storing the attachment and the logged results in a secure repository, scanning the attachment to determine characteristics of the attachment, and clustering the scanned attachment into a group based on the determined characteristics.

In some embodiments, the method further comprises the step of utilizing the clustered group, which includes the determined characteristics of the scanned attachment, when determining whether an email message is to be quarantined.

The security services can include one or more of anti-virus, advanced persistent threat (APT), anti-spam and anti-malware services (but are not limited to those specific services).

In certain implementations, the step of scanning the attachment is performed by running the attachment against Yara rules.

In some embodiments of the method, clustered emails are prioritized based on perceived threat level.

Embodiments of the present invention further include a method of enhanced security analysis for quarantined email messages that comprises receiving into a quarantine, at an email gateway an inbound email message from an external network determined to have suspicious characteristics, restructuring the email message as an attachment for a new email, constructing a new email message address to a secure repository on a secure pathway, attaching the restructured email message to the new email message, releasing, from the email gateway, the new email message that includes the restructured email message as an attachment to, receiving at one or more security services within a secure pathway an email that includes as an attachment a complete suspicious email including header and body content, analyzing the attachment at the one or more security services, logging results of the analysis by the one or more security servers, scanning the attachment to determine characteristics of the attachment, and clustering the scanned attachment into a group based on the determined characteristics. The restructured email message includes header information included in the email message received at the email gateway from the external network.

In some embodiments, the method further comprises the step of utilizing the clustered group, which includes the determined characteristics of the scanned attachment, when determining whether to quarantine a further inbound email message from the external network.

In some embodiments, the security services include one or more of anti-virus, advanced persistent threat (APT), anti-spam and anti-malware services.

In certain implementations, the step of scanning the attachment is performed by running the attachment against Yara rules.

In some embodiments of the method, clustered emails are prioritized based on perceived threat level.

Within the email gateway, the step of determining whether the email message can be performed by comparing one or more parts of the email message against configured lists of suspicious indicators.

These and other aspects, features, and advantages can be appreciated from the following description of certain embodiments of the invention and the accompanying drawing figures and claims.

BRIEF DESCRIPTION OF THE DRAWINGS

FIG. 3 is a flow chart of a method of enabling enhanced security analysis for quarantined email messages according to an embodiment of the present invention.

FIG. 4 is a flow chart of a method of enhanced security analysis for quarantined email messages according to an embodiment of the present invention.

DETAILED DESCRIPTION CERTAIN OF EMBODIMENTS OF THE INVENTION

Disclosed herein is a method for enhanced security analysis of quarantined communications such as blocked email messages. An enterprise network includes an email gateway which serves as an entry point for incoming emails from an external network to the enterprise network. The email gateway is configured to quarantine emails, such as those that contain known malicious content or which are otherwise perceived as possibly having content that exhibits suspicious behavior when executed. The gateway is also configured to automatically reconstruct each quarantined email in a different format in which the original quarantined email, including all the metadata it contains, is attached to a new email message. Specifically, the new email message includes the header information contained in the original quarantined email. The new email message that includes the quarantined email attachment is sent along a segregated communication path to a secure mail server. By contrast, the email gateway releases unblocked (non-quarantined) emails to a regular "in-line" path.

The secure email server is configured to host suspicious messages in a secure zone. The secure email server can release the attached message from the reconstructed email message for inspection within the secure zone using one or more security checks such as APT and anti-virus. During and/or subsequent to the security check layers, the released suspicious emails are scanned, analyzed, and logged. Security check results are reported to support teams. The emails are then delivered to a repository server that is configured to securely store the email messages. The repository server reads the received message and runs pre-defined and customized Yara rules against the received emails. The Yara rules can be used to automatically cluster, tag and prioritize the suspicious emails based on their content. The prioritization of suspicious content helps direct the attention of support teams to the most threatening messages.

Figure 1:
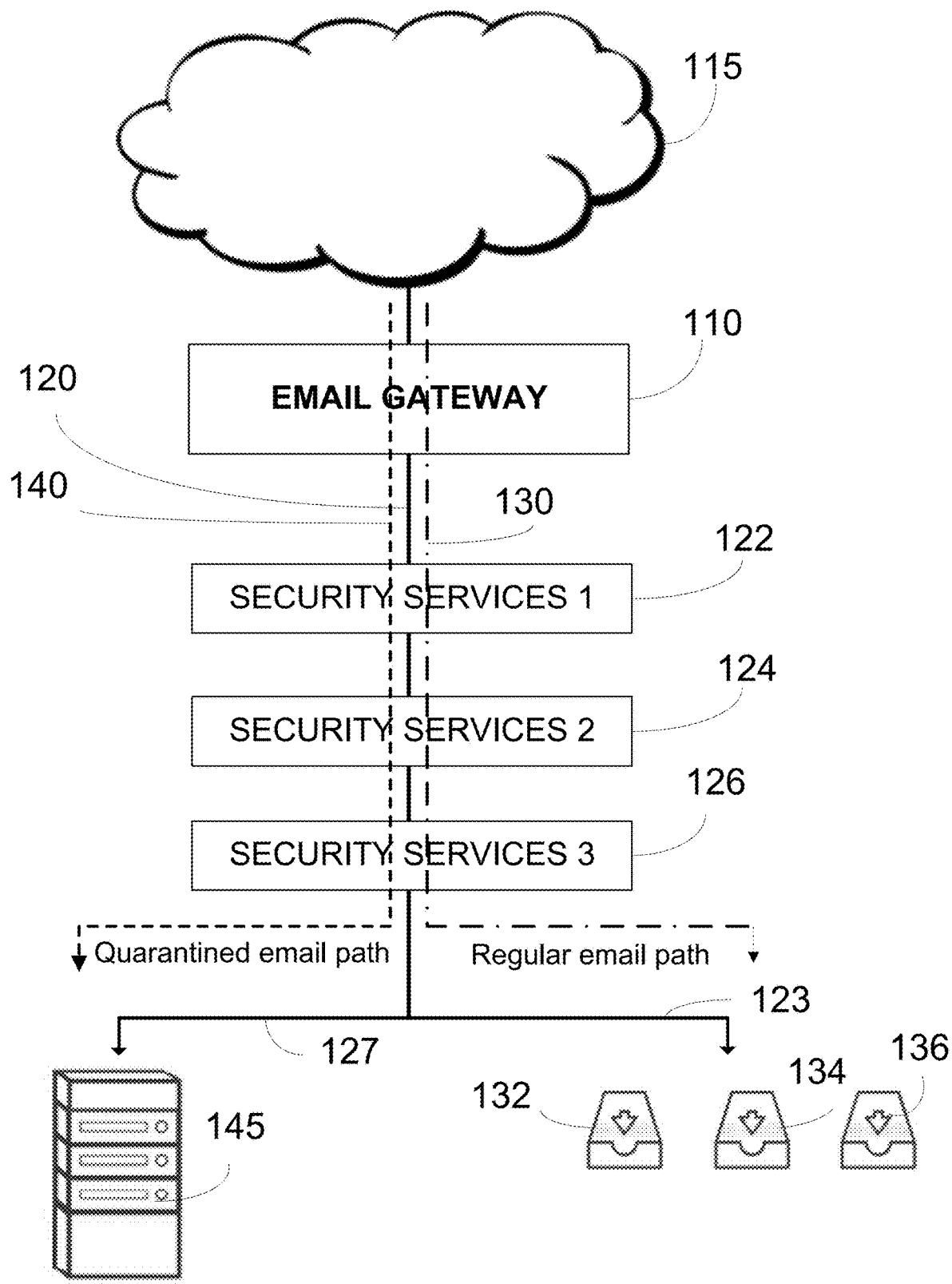
FIG. 1 is a schematic diagram showing a part of an enterprise IT network that receives emails from an external network according to an embodiment of the present invention.

FIG. 1 is a schematic diagram showing a part of an enterprise IT network that receives emails from an external network according to an embodiment of the present invention. In FIG. 1, an email gateway 110 is communicatively coupled to external network 115, which can be a public network such as the Internet. The email gateway 110 receives emails from the external network 115 and forms the first line of defense for the network from email communication threats. The gateway 110 performs basic filtering and inspection operations and can quarantine (block) emails that contain known malicious content such as spam, phishing attacks, and malware. On the downstream side, email gateway 110 outputs email communications on a secure, encrypted physical channel 120. The secure channel 120 supports two logical pathways, an in-line pathway 130 and a segregated pathway 140. Emails that are not considered suspicious and therefore are not quarantined by the email gateway are released by the gateway via the in-line path 130. Conversely, emails that are quarantined at the gateway are eventually output along the segregated pathway 140 in the manner described below as attachments to newly constructed email messages. Along both paths 130, 140, emails released from the gateway (both suspicious and non-suspicious) are scanned by one or more security systems and/or services (collectively referred to as "security services" herein). In the embodiment depicted in FIG. 1, emails are scanned and analyzed by three layers of security services, security service 1 (122), security service 2 (124), and security service 3 (126). The security services 122, 124, 126 can include, but are not limited to advanced persistent solutions (APT), anti-virus solutions and malware solutions.

The security services 122, 124, 126 gather intelligence concerning the emails output from the email gateway and also log and report results of analyses performed. It is particularly useful for the security services to acquire intelligence regarding the attached emails directed by the email gateway along the segregated path 140 per the methods of the present invention. As these email messages are considered suspicious at a first pass, a thorough inspection is performed to determine, when possible, the source of the messages, whether similar header or body content has been encountered previously, and whether the message contains anomalous code or other features.

Downstream from the security service checks, the secure channel 120 splits into first and second branches 123, 127. Emails communicated via the in-line logical path 130 are directed along the first channel 123 which delivers the emails to the organizational email inboxes e.g., 132, 134, 136 to which the messages are addressed. Emails communicated via the segregated logical path 140 are delivered to a secure email repository 145. The email repository 145 is configured to separate the attachments (constituting the original quarantined messages) from the received email messages, and to scan the original email messages using pre-defined and customized Yara rules. Signatures yielded by the Yara rules and email header information can be used to automatically cluster and identify (tag) the emails. Through the clustering and identification of the suspicious emails, the email can be prioritized according to threat level or other criteria for further inspection and analysis by support teams and IT personnel. Through this process IT personnel gain insight into the types of threats being quarantined and the nature of the threats that the quarantined emails potentially present to the enterprise network. In addition, the email repository 145 can be integrated with additional security services such as APT and antivirus solutions for further analysis.

Figure 2:
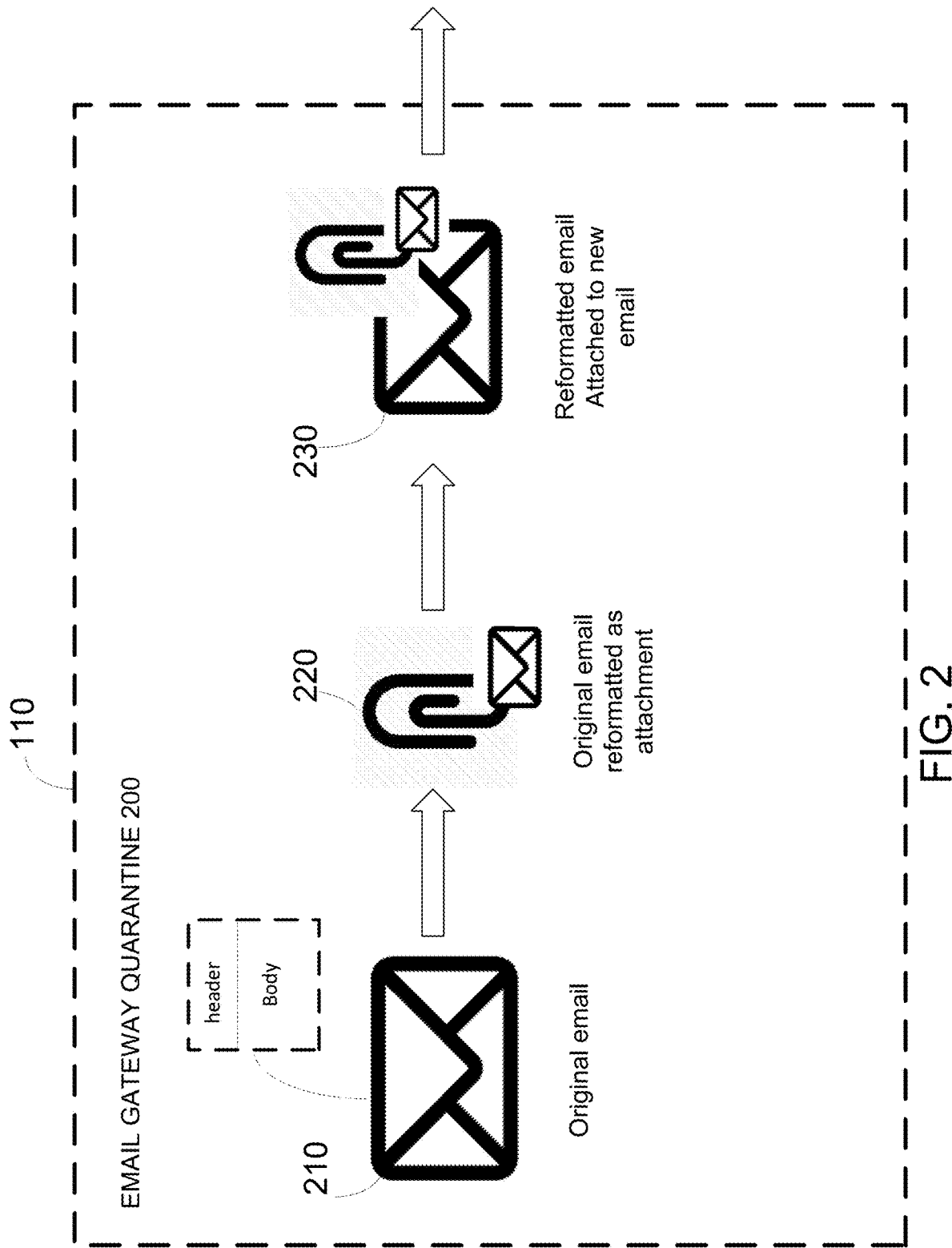
FIG. 2 is a schematic illustration of a method for attaching blocked emails to another email as an attachment at an email gateway according to an embodiment of the present invention.

FIG. 2 is a schematic illustration of a method for attaching blocked emails to another email as an attachment at an email gateway according to an embodiment of the present invention. As shown, an email 210 received from an external network is stored in a quarantine 200 in the email gateway. The received email 210 includes both a header section that typically includes source and destination address information and a body section that typically includes the content of the message. The email gateway 110 is equipped with functionality for processing emails. One of the functions, termed a Notification function" is used to send alerts through the network upon receipt of certain emails, depending upon configuration of the function. As an example, the Notification function is used to alert IT personnel when emails from known suspicious sources are received at the gateway. To send alerts, the Notification function proceeds by restructuring the received message as an attachment to a new email directed to the address of the intended IT personnel. The attachment retains all header and body information contained in the original received email. According to the present invention, the Notification function is configured in an unconventional manner to restructure all quarantined email as attachments to new emails. As shown in FIG. 2, the original email is first converted to an attachment 220, that is attached to a new email 230 that is addressed to be sent along the segregated logical path 140 (in FIG. 1). Email 230 with attachment 220 is then released from the email gateway quarantined, while the attachment 220 retains the header and body information of original email 210. As such, the email is "blocked" in that it is not communicated along the in-line pathway toward the email inboxes, but rather, the email is preserved as an intact attachment for analysis along the segregated path.

FIG. 3 is a flow chart of a method for preparing enhanced security analysis for quarantined email messages according to an embodiment of the present invention. The method begins in step 300. In step 302, an email is received by the email gateway. In step 304, the email gateway determines, using code executing in a processor of the email gateway, whether to quarantine the email based on the source, header content, and other characteristics of the email. If it is determined that the email should not be quarantined, in step 306 the gateway releases the email to the secure channel 120 via the in-line logical path for regular processing and analysis, again, using code executing in a processor of the email gateway. If the programmed gateway determines, in step 304, that the email should be quarantined, in step 308 it is stored temporarily in a quarantine at storage within or directly coupled to the email gateway. In step 310, the email gateway restructures (reformats) one or more of the quarantined emails as an attachment for a new email, again using code executing in a processor of the email gateway. The attachment retains the header and body information of the quarantined emails. In step 312, the email gateway constructs new addressed to a secure server via the segregated pathway using code executing in a processor of the email gateway. In step 314, the attachments are added to the new emails by the email gateway. In step 316, the emails with the attachments of previously quarantined emails are released from the email gateway to the secure channel 120 via the segregated logical path 140. The method ends at step 318.

FIG. 4 is a flow chart of a method for enhanced security analysis for quarantined email messages according to an embodiment of the present invention. The method begins at step 400. In step 402, reconstructed emails released by the email gateway (including attachments) are received. In a following step 404, the attachments of the emails are analyzed by one or more security services (e.g., APT, malware, anti-virus analyses). At each security service, scripts are implemented to automatically release the reconstructed email messages if they become blocked. In step 406, the security services log and report results of the analysis using conventional code. In step 408, the attachments and reported results are sent to a email repository for storage. The repository separates the attachment from the reconstructed email in step 410, and in step 412, the repository scans the received emails using pre-defined and customized Yara rules using code or scripts executing or running at the repository. The Yara rules effectively filter the emails so that, in step 414, the emails can be clustered in groups and prioritized for further analysis by IT personnel. The method ends in step 416.

It will be appreciated that in certain embodiments, the method includes fewer or additional steps. For instance, the method of FIG. 4 can further comprise the step of utilizing the clustered group described above when determining whether an email message is to be quarantined and sent to the secure server, that is, when determining whether to quarantine a further inbound email message from the external network. This is accomplished using code executing in the secure server or using a script running thereon.

It is to be understood that any structural and functional details disclosed herein are not to be interpreted as limiting the systems and methods, but rather are provided as a representative embodiment and/or arrangement for teaching one skilled in the art one or more ways to implement the methods.

It is to be further understood that like numerals in the drawings represent like elements through the several figures, and that not all components and/or steps described and illustrated with reference to the figures are required for all embodiments or arrangements.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing, and are not to be construed as limiting. However, it is recognized these terms could be used with reference to a viewer. Accordingly, no limitations are implied or to be inferred.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of enabling enhanced security analysis for quarantined email messages, comprising:

receiving, at an email gateway, an inbound email message from an external network, the email message comprising header information including the source and destination address information, and the email message further comprising a body including the content of the message;

determining that the email message is to be quarantined based on an initial analysis of suspiciousness;

restructuring the email message as an attachment for a new email that includes the header information and body of the email message;

constructing a new email message addressed to a secure repository on a secure pathway that is separate from a default, in-line pathway of the inbound email message, wherein the secure repository is separate from the mailbox corresponding to the destination address;

attaching the restructured email message to the new email message; and releasing the new email message that includes the restructured email message as an attachment via the secure pathway.

2. The method of claim 1, wherein the restructured email message includes header information included in the email message received at the email gateway from the external network.

3. The method of claim 1, further comprising:
releasing the email message to regular security services along an in-line pathway when it is determined that the message is not to be quarantined.

4. The method of claim 1, wherein determining whether the email message is to be performed by comparing one or more parts of the email message against configured lists of suspicious indicators.

5. A method of enhanced security analysis for email messages, comprising:

receiving, at an email gateway, an inbound email message from an external network, the email message comprising header information including the source and destination address information, and the email message further comprising a body including the content of the message;

determining that the email message is to be quarantined based on an initial analysis of suspiciousness;

restructuring the email message as an attachment for a new email that includes the header information and body of the email message;

receiving, at a secure repository on a secure pathway that is separate from a default, in-line pathway of the inbound email message, wherein the secure repository is separate from the mailbox corresponding to the destination address, the new email that includes the attachment;

analyzing the attachment using the one or more security services;

logging results of the analyzing step;

storing the attachment and the logged results in the secure repository;

scanning the attachment to determine characteristics of the attachment; and clustering the scanned attachment into a group based on the determined characteristics.

6. The method of claim 5, further comprising the step of utilizing the clustered group, which includes the determined characteristics of the scanned attachment, when determining whether an email message is to be quarantined.

7. The method of claim 5, wherein the security services include one or more of anti-virus, advanced persistent threat (APT), anti-spam and anti-malware services.

8. The method of claim 5, wherein the step of scanning the attachment is performed by running the attachment against Yara rules.

9. The method of claim 5, further comprising prioritizing clustered emails based on perceived threat level.

10. A method of enhanced security analysis for quarantined email messages, comprising:

receiving into a quarantine, at an email gateway an inbound email message from an external network determined to have suspicious characteristics, the email message comprising header information including the source and destination address information, and the email message further comprising a body including the content of the message;

restructuring the email message as an attachment for a new email that includes the header information and body of the email message;

constructing a new email message addressed to a secure repository on a secure pathway that is separate from a default, in-line pathway of the inbound email message, wherein the secure repository is separate from the mailbox corresponding to the destination address;

attaching the restructured email message to the new email message;

releasing, from the email gateway, the new email message that includes the restructured email message as an attachment;

receiving at one or more security services within the secure pathway the email with the attachment released from the email gateway;

analyzing the attachment at the one or more security services;

logging results of the analysis by the one or more security servers;

scanning the attachment to determine characteristics of the attachment; and clustering the scanned attachment into a group based on the determined characteristics.

11. The method of claim 10, further comprising the step of utilizing the clustered group, which includes the determined characteristics of the scanned attachment, when determining whether to quarantine a further inbound email message from the external network.

12. The method of claim 10, wherein the restructured email message includes header information included in the email message received at the email gateway from the external network.

13. The method of claim 10, wherein the security services include one or more of anti-virus, advanced persistent threat (APT), anti-spam and anti-malware services.

14. The method of claim 10, wherein the steps of scanning the attachment is performed by running the attachment against Yara rules.

15. The method of claim 10, further comprising prioritizing clustered emails based on perceived threat level.

16. The method of claim 10, wherein determining whether the email message is to be performed by comparing one or more parts of the email message against configured lists of suspicious indicators.

* * * * *